US008004575B2

(12) United States Patent
Justiss et al.

(10) Patent No.: US 8,004,575 B2
(45) Date of Patent: Aug. 23, 2011

(54) METHODS AND SYSTEMS FOR DETECTING BRIGHT OBJECTS AND/OR ADAPTIVELY MODIFYING VIDEO CAMERA EXPOSURE

(75) Inventors: Joseph M. Justiss, Austin, TX (US); Michael J. Horowitz, Austin, TX (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1512 days.

(21) Appl. No.: 11/416,786

(22) Filed: May 3, 2006

(65) Prior Publication Data

US 2007/0258007 A1 Nov. 8, 2007

(51) Int. Cl.
*H04N 5/228* (2006.01)

(52) U.S. Cl. ............... 348/222.1; 348/223.1; 348/227.1; 348/228.1; 348/229.1; 348/362

(58) Field of Classification Search ............... 348/222.1, 348/223.1, 227.1, 229.1, 362
See application file for complete search history.

(56) References Cited

U.S. PATENT DOCUMENTS

| | | | | |
|---|---|---|---|---|
| 4,174,161 | A * | 11/1979 | Mashimo et al. | 396/67 |
| 6,816,200 | B1 * | 11/2004 | Gough | 348/362 |
| 7,526,194 | B2 * | 4/2009 | Kim | 396/213 |
| 2006/0244921 | A1 * | 11/2006 | Childers | 353/30 |

OTHER PUBLICATIONS

Bosch, FAQs for Dinion$^{XF}$ Day/Night Cameras (LTC 0495 & LTC 0620), Jun. 2005, 2 pgs.

Copending U.S. Appl. No. 11/416,787; entitled "Methods and Systems for Estimation of Visible Light Amount in a Light Source", Filed May 3, 2006, (COVI:018), 39 pgs.

Extreme CCTV, Surveillance Systems, License Plate Capture Solutions, © 2006, the subject matter of which was publicly available prior to the May 3, 2006 filing date of the present application, 2 pgs.

* cited by examiner

*Primary Examiner* — Yogesh K Aggarwal
(74) *Attorney, Agent, or Firm* — Kinney & Lange, P.A.

(57) ABSTRACT

Methods and systems for automatically detecting the presence or absence of a bright object in the field of view of a video camera and/or for adaptively modifying video camera exposure level. A video camera system may be configured to enter and exit an adaptive exposure modification mode upon detection of the presence of a bright object in the field of view of a video camera.

30 Claims, 5 Drawing Sheets

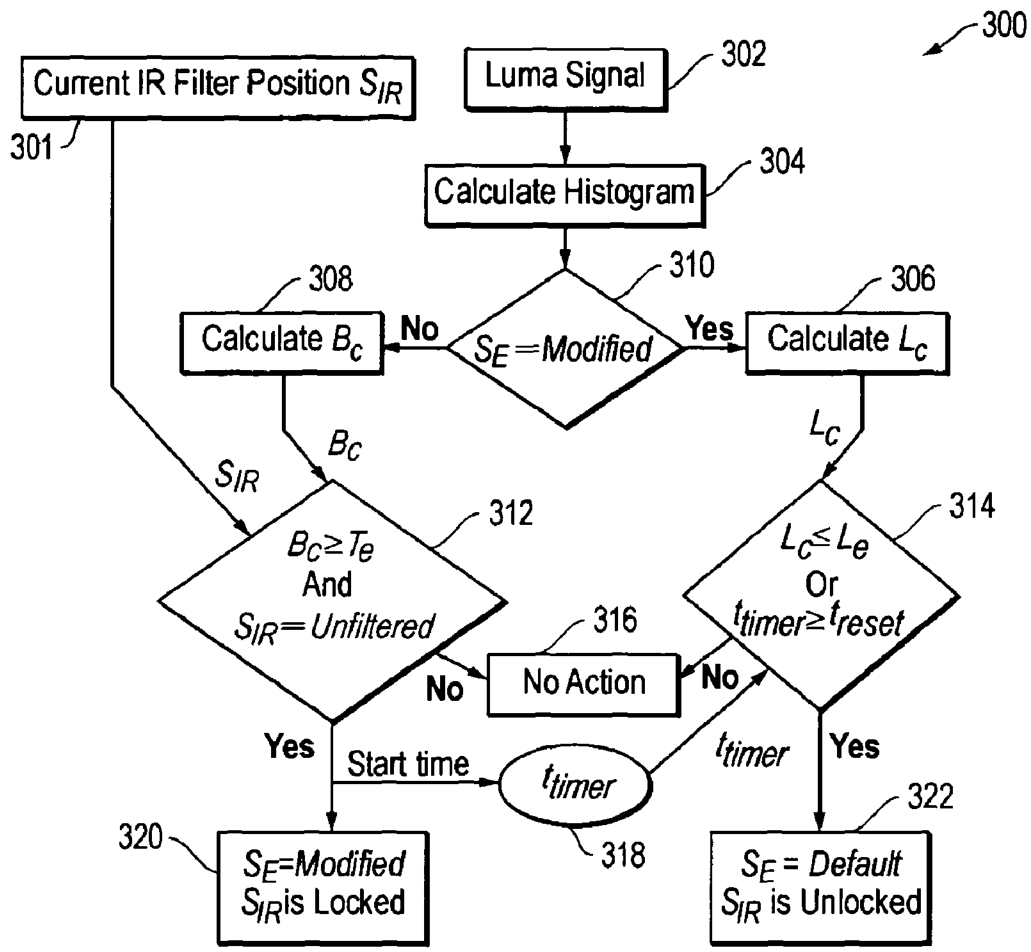

LEGEND:

$L_c$ is the current amount of light energy incident on the sensor, $L_e$ is the amount of light energy that was incident on the sensor before the bright event was detected, $B_c$ is the number of bright luma samples, $T_e$ is the minimum number of bright luma samples required to detect a bright event, $S_E$ is the state of the current exposure (Default or Modified), $S_{IR}$ is the state of the removable IR filter block (Filtered or Unfiltered). $S_{IR}$ equals Filtered in bright light and Unfiltered in low light. Locked means $S_{IR}$ cannot change states and Unlocked means that $S_{IR}$ can change states, $t_{timer}$ is a timer measured in seconds that starts when the event is detected, $t_{reset}$ is the maximum amount time before $S_E$ reverts to Default and $S_{IR}$ is unlocked.

*FIG. 3*

LEGEND:

$B_c$ is the number of bright luma samples,
$T_b$ is the maximum number of bright luma samples that are allowed without taking action,
$S_E$ is the current exposure state (Default or Modified),
$XP_{out}$ indicates default exposure level,
$XP_{new}$ indicates exposure level following operation of adaptive exposure modification algorithm.

METHODS AND SYSTEMS FOR DETECTING BRIGHT OBJECTS AND/OR ADAPTIVELY MODIFYING VIDEO CAMERA EXPOSURE

FIELD OF THE INVENTION

This invention relates generally to video cameras, and more particularly to detection of bright objects and/or modification of video camera exposure.

BACKGROUND OF THE INVENTION

In the field of video surveillance, it is often desirable to capture an image of a vehicle license plate with a video camera to allow reading of the license plate information, for example, to facilitate identification or verification of the vehicle or its occupants. Under some conditions, it is necessary to capture an image of a vehicle license plate under relatively low light conditions. Automatic exposure control during license plate capture in low-light is made difficult by the very large dynamic range of lighting that typically exist under such conditions. Specifically, car headlights and taillights that may be significantly brighter than the license plate are typically combined with a poorly illuminated background that may be many times darker. In addition, motion of the license plate relative to the camera requires an auto-exposure algorithm to react quickly and complicates the exposure process since an exposure level must be selected to minimize image blur (a particular problem in low-light when a camera's exposure time might otherwise be longer). Although auto-exposure algorithms may allow for capture of license plate images during the day, under low light conditions they tend to overexpose headlights, taillights, and license plates that have been illuminated by an external infrared (IR) or visible light source.

Video surveillance cameras are currently available that are dedicated for license plate capture. These dedicated cameras make use of multiple snapshots, each with a different exposure time, to capture images of license plates. Out of the multiple snapshots captured by the dedicated surveillance camera, the hope is that one snapshot will have the correct balance of exposure and motion blur for capture of the license plate image. These cameras are dedicated license plate image capture devices and do not allow for non-license plate image capture related surveillance. Thus, it is necessary to add other video cameras to handle more general surveillance tasks.

SUMMARY OF THE INVENTION

Disclosed herein are methods and systems for automatically detecting the presence or absence of a bright object (e.g., license plate candidate) in the field of view of a video camera and/or for adaptively modifying video camera exposure level to improve ability to capture information or other details from the bright object. Such information or other details may include, for example, alpha or numeric characteristics depicted on the object, graphic designs depicted on the object, one or more physical characteristics of the object (e.g., borders, raised features, size, etc.), one or more color/s of the object, etc.

A bright object may be any object in the field of view of a video camera which is brightly lit relative to the background of the video camera field of view. In some cases, such a bright object may not be as brightly lit as other objects in the field of view. For example, a license plate on an automobile may be brightly illuminated by an external visible or IR light source as compared to a relatively dimly lit background (e.g., night scene background) in the field of view of a video camera, but the same license plate may not be as brightly lit (in some cases significantly less brightly lit) as internally illuminated automobile headlights or taillights that are simultaneously present in the same field of view of the video camera. These bright exposure conditions may result, for example, from the relative dimness of the background. Such a bright object may have information or other detail/s which are not discernable in the displayed video due to bright exposure conditions that obscure (e.g., "wash out") the information or other detail/s of the object.

In one embodiment of the disclosed methods and systems, a video camera system may be configured to enter and exit (respectively) an adaptive exposure modification mode upon detection of the presence of a bright object in the field of view of a video camera. In this embodiment, the adaptive exposure modification algorithm may be configured to be capable of modifying an exposure level for an object that is brightly illuminated by an external IR or visible light source in a low-light environment (e.g., night) so that the modified exposure level improves ability to capture information from the object, e.g., to improve legibility of text and/or numbers of a brightly lit license plate.

In one embodiment, a video camera system may be configured to adaptively modify exposure level of a bright object that is present in the field of view of a video camera. In one exemplary embodiment, such a bright object may be a license plate candidate, i.e., an object in the field of view of a video camera that requires modification of video exposure level in order to determine whether it is or is not a license plate.

In another embodiment, a video camera system may be configured to automatically detect the presence of a bright object (e.g., license plate candidate) in the field of view of the video camera and to enter an adaptive exposure modification mode that optimizes capture of information from the bright object (e.g., improves legibility of the license plate information under the lighting conditions). The video camera system may also be configured to automatically exit the adaptive exposure modification mode when the bright object is no longer detected in the field of view of the video camera, and/or after some other criteria is satisfied (e.g., after a given length of time operating in adaptive exposure modification mode, etc.). The disclosed adaptive exposure modification capability may be advantageously implemented to enable a single video camera to both capture information from brightly lit objects (e.g., license plates) over a wide variety of lighting conditions, as well as to perform more general surveillance tasks or duties under a wide range of lighting scenarios.

In one embodiment, the disclosed methods and systems may be implemented using a three stage adaptive exposure modification algorithm operating, for example, as part of a video camera system. In the first stage, the algorithm automatically identifies license plate candidates by analysis of characteristics of a video image, e.g., that represents a scene that is illuminated with IR or visible light in the presence of headlights, taillights, and in combination with a poorly illuminated background. Upon detection of a license plate candidate in the video image, the adaptive exposure modification algorithm modifies exposure of the video image to enhance capture of information from the license plate. In the third stage, the algorithm automatically determines when the license plate candidate has left the field of view, at which time the adaptive exposure modification algorithm exits the modification mode and no longer modifies the exposure of the video image.

In one exemplary embodiment, an adaptive exposure modification algorithm may be implemented on a video camera system and employ a histogram function to detect when a bright object event occurs. As used herein, a bright object event refers to an event in which one or more bright object/s (e.g., headlights and/or taillights in combination with a license plate) enter the field of view of the video camera system that is generating a video image having a default video exposure level. Upon detecting the bright object event, the adaptive exposure modification algorithm may be configured to automatically switch into an exposure modification mode and modify the default exposure of the video image generated by the video camera system to more properly expose the license plate as opposed to (and despite the presence of) the headlight or taillights. After the adaptive exposure modification algorithm detects that the bright object/s have left the video camera system field of view and the light within the system field of view has returned to level that existed before the occurrence of the pre-bright object event, the adaptive exposure modification algorithm may be configured to automatically exit the exposure modification mode so that it no longer modifies the default exposure of the video image.

In one respect, disclosed herein is a method for detecting bright objects in a video image, including determining the number of bright luma samples in the video image, and then determining if the number of bright luma samples in the video image is indicative of the presence of at least one bright object in the video image.

In another respect, disclose herein is a method for modifying a default exposure level of a video image, including determining the number of bright luma samples in the video image having a default exposure, and modifying the default exposure level of the video image based on a comparison of the number of bright luma samples in the video image to an exposure modification threshold number of luma samples.

In another respect, disclosed herein is a system configured to detect bright objects in a video image, the system including logic configured to determine the number of bright luma samples in the video image, and then determine if the number of bright luma samples in the video image is indicative of the presence of at least one bright object in the video image.

In another respect, disclosed herein is a system configured to modify a default exposure level of a video image, the system including logic configured to determine the number of bright luma samples in the video image having a default exposure, and modify the default exposure level of the video image based on a comparison of the number of bright luma samples in the video image to an exposure modification threshold number of luma samples.

BRIEF DESCRIPTION OF THE DRAWINGS

FIG. 3 shows interrelated states and methodology according to one exemplary embodiment of the disclosed methods and systems.

DESCRIPTION OF ILLUSTRATIVE EMBODIMENTS

Figure 1:
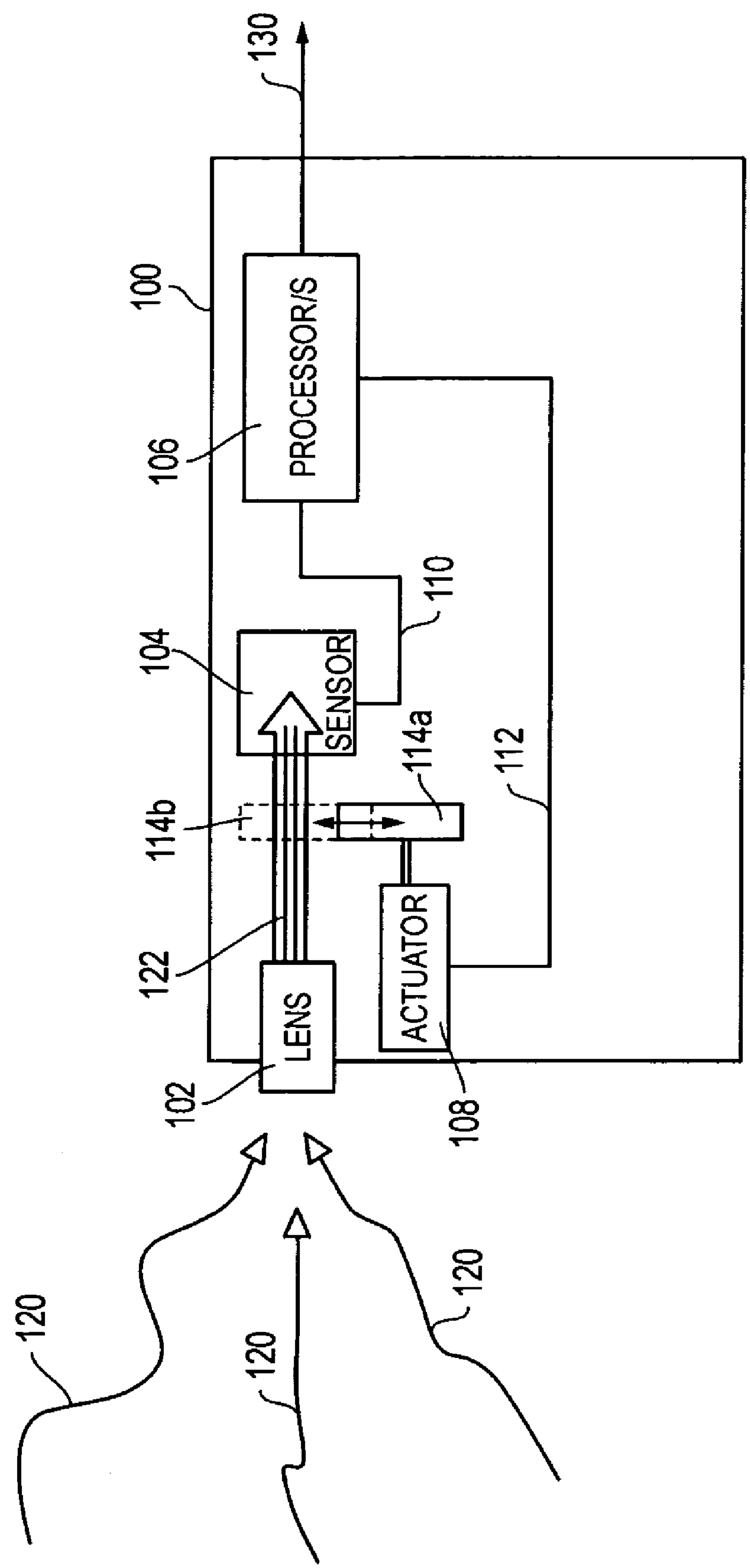
FIG. 1 is a block diagram of a color video camera system according to one exemplary embodiment of the disclosed methods and systems.

FIG. 1 illustrates a color video camera system 100 (e.g., color security or surveillance camera) as it may be configured according to one exemplary embodiment of the disclosed methods and systems. In this embodiment, camera system 100 is configured with an optical path that includes optics in the form of lens 102 that is provided to collect light 120 received from a light source (e.g., a scene under surveillance by camera system 100) and to transmit this collected light energy along the optical path as collected light stream 122 to an image sensor 104 where collected light 122 is sensed. Image sensor 104 may be any type of image sensor (e.g., CCD or CMOS) capable of sensing light energy in collected light stream 122 and capable of providing image signal 110 that includes information representative of color characteristics of light energy within collected light stream 122, e.g., bayer pattern red-green-blue ("RGB"), cyan-magenta-yellow ("CMY"). Specific examples of suitable image sensors include, but are not limited to, AltaSens ProCamHD 246x and 256x series, Micron MT9x series, etc. Although a color video camera system 100 is described and illustrated in the exemplary embodiment of FIG. 1, it will be understood that the disclosed methods and systems may also be implemented with a black and white video camera system.

As further illustrated in FIG. 1, one or more processors 106 (e.g., multiprocessor, DSP, or other suitable processor/s) may be present in camera 100 for implementing one or more tasks (e.g., logic, algorithms, etc.) such as image sensor signal conditioning, image processing, digital to analog conversion, etc. A video output signal 130 (e.g., digital video output signal, analog video output signal, etc.) is shown provided by color video camera system 100. In one possible embodiment, color video camera system 100 may provide a digital video output signal to a video access component (e.g., stream server) for delivery as a coded video stream across an IP network medium. In another possible embodiment, color video camera system 100 may provide a digital video output signal suitable for delivery to a digital video recorder and/or for display on a video display device. It will be understood that these embodiments are exemplary only, and that color video camera system 100 may provide any other type of digital and/or analog video output signal that is suitable for transmission, display, recording, etc.

As shown in FIG. 1, a movable IR block filter 114 (e.g., IR filter sled) is provided that is configured so that it is capable of being selectably inserted into and retracted from the optical path between lens 102 and image sensor 104. An actuator 108 (e.g., motor, solenoid, etc.) is provided to move IR block filter 114 from a first position (represented in solid outline by 114_a_) that is retracted out of the optical path between lens 102 and image sensor 104 to a second inserted position (represented in dashed outline by 114_b_) that is inserted into the optical path between lens 102 and image sensor 104. In one exemplary embodiment, IR block filter 114 may be any material that is at least partially transparent to visible light (e.g., light having a wavelength from about 400 nanometers to about 770 nanometers), while at the same time being substantially opaque or substantially non-transmissive to near IR light (e.g., light having a wavelength from greater than about 770 nanometers to about 1200 nanometers).

Still referring to FIG. 1, when deployed in its second inserted position 114*b*, IR block filter 114 acts to filter out or remove IR light energy from collected light stream 122 before it reaches image sensor 104, while at the same time allowing visible light energy from collected light stream 122 to reach image sensor 114. When deployed in its second retracted position 114*a*, substantially all of visible and IR light energy of collected light stream 122 is allowed to reach image sensor 104. Although not shown in this embodiment, it will be understood that other optional filter components (e.g. ultra-violet (UV) filter component, etc.) may also be present in the light path between lens 102 and video sensor 104 to filter out other wavelengths from collected light stream 122. As further shown in FIG. 1, processor/s 106 (e.g., one or more Central Processing Units, CPUs) may be coupled to control actuator 108 using IR block filter control signals 112 to selectably position IR block filter 114 between first and second positions 114*a* and 114*b*, although IR block filter 114 may be selectably positioned using any other suitable combination of actuator/s and/or processor/s. In this regard, processor/s 106 may be configured to control actuator 108 using variable threshold logic and/or multiple color difference logic described further herein, e.g., implemented as algorithm/s executing on processor/s 106. Further information on methodology and algorithms for controlling insertion and retraction of IR block filter 114 may be found in U.S. patent application Ser. No. 11/416,787 entitled "METHODS AND SYSTEMS FOR ESTIMATION OF VISIBLE LIGHT IN A LIGHT SOURCE" by Horowitz, et al. that is concurrently filed herewith on the same day as this patent application, and which is incorporated herein by reference.

In one embodiment of the disclosed methods and systems, the presence of a license plate in the field of view of a video camera system (e.g., such as color video camera system 100 of FIG. 1) may be detected using an algorithm such as Equation 1 below to provide a value for $B_c$. In this regard, the algorithm of Equation 1 may be executing, for example, on processor/s 106 of the color video camera system 100 of FIG. 1. In Equation 1, $B_c$ represents bright luma samples (e.g., samples of black/gray/white information in a video signal) which are the number of luma samples with values larger than some threshold value $\tau$. This threshold value $\tau$ may be selected, for example, based on the smallest luma sample value that will appear overexposed (i.e., the video sensor element corresponding to the luma sample has been exposed to so much light that all meaningful image detail is lost) when processed by the camera and then reproduced by a particular display monitor. An example of a threshold value $\tau$ for video with eight-bit luma samples (i.e., each luma sample may have a value between 0 and 255 inclusive) is 250, although greater or lesser $\tau$ values are also possible.

$$B_c \equiv \int_{\tau}^{\infty} h(i)di \qquad \text{Equation (1)}$$

where:

$B_c$ is the number of bright luma samples, $\tau$ is the lower bound of brightness that defines an overexposed luma sample and h(i) is the luminance histogram.

Figure 2:
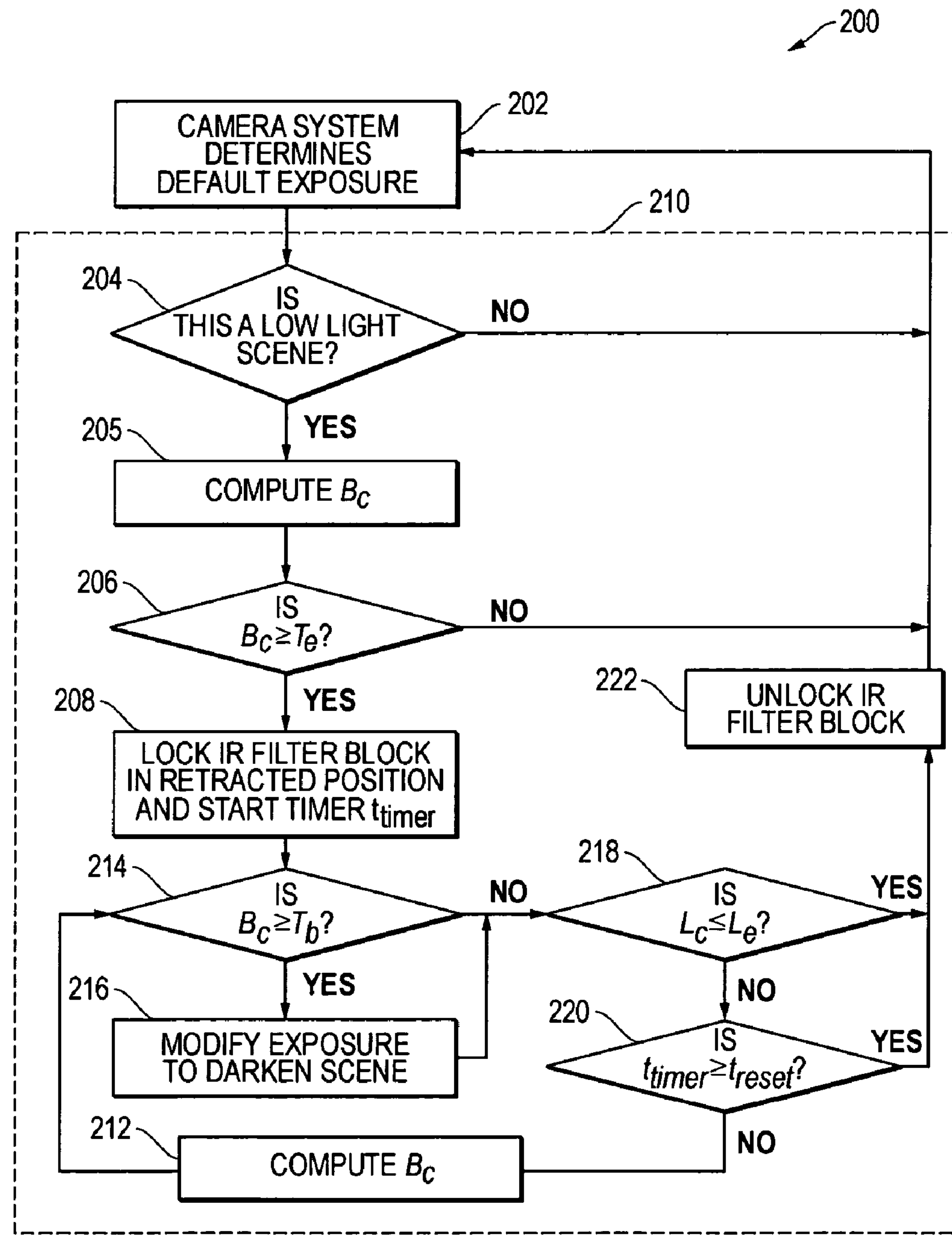
FIG. 2 is a flow diagram showing methodology according to one exemplary embodiment of the disclosed methods and systems.

FIG. 2 illustrates one embodiment of a methodology 200 that may employ $B_c$ of Equation 1 (e.g., using processor/s 106 of a color video camera system 100) to detect the presence of a bright object and to modify exposure based thereupon. As shown in step 202, video camera system 100 may be configured to generate a default exposure under normal conditions (e.g., no license plate detected in the field of view), for example, using any suitable default exposure determination logic executing on processor/s 106. Such a default exposure may be a fixed exposure for a given set of default light conditions, may be a variable exposure determined by an auto-exposure algorithm (e.g., a histogram-based algorithm that measures the amount of bright and dark luma samples in a frame and adjusts exposure to achieve some prescribed balance of bright and dark samples), may be other logic and/or hardware capable of adjusting exposure, etc.

As shown in FIG. 2, methodology 200 enters an adaptive exposure modification algorithm 210 at step 204, in which it is determined whether video camera system 100 is viewing a low-light scene. In this regard, existence of a low light scene may be determined using any methodology suitable for identifying light conditions under which exposure modification is desired or needed to enhance the ability to capture information or other details from a bright object. In one exemplary embodiment, default exposure level may be compared to a specified light threshold to determine if the default exposure level is below the specified light threshold, and a low light scene may be determined to exist if the default exposure level is below the specified light threshold. In one particular example, such a specified light threshold may be the same light threshold (e.g., gain factor threshold) at which an IR block filter 114 is retracted from an optical path of the camera system 100. In another alternative exemplary embodiment, a low-light scene may be considered to exist when a retractable IR block filter 114 is in retracted position (i.e., position 114*b*). Further information on retraction of an IR block filter based on light conditions may be found in U.S. patent application Ser. No. 11/416,787 entitled "METHODS AND SYSTEMS FOR ESTIMATION OF VISIBLE LIGHT IN A LIGHT SOURCE" by Horowitz, et al. which has been incorporated herein by reference.

If a low light scene is not determined to exist in step 204, the adaptive exposure modification algorithm 210 exits without modifying the default exposure as shown. However, if a low light scene is determined to exist in step 204, then the adaptive exposure modification algorithm 210 proceeds to step 205 where $B_c$, the number of bright luma samples, is determined using Equation (1), and then to step 206 where Inequality (2) is evaluated.

$$B_c \geqq t_e \qquad \text{Inequality (2)}$$

where:

$B_c$ is the number of bright luma samples and $T_e$ is the minimum number of bright luma samples required to detect a bright event.

Figure 5A:
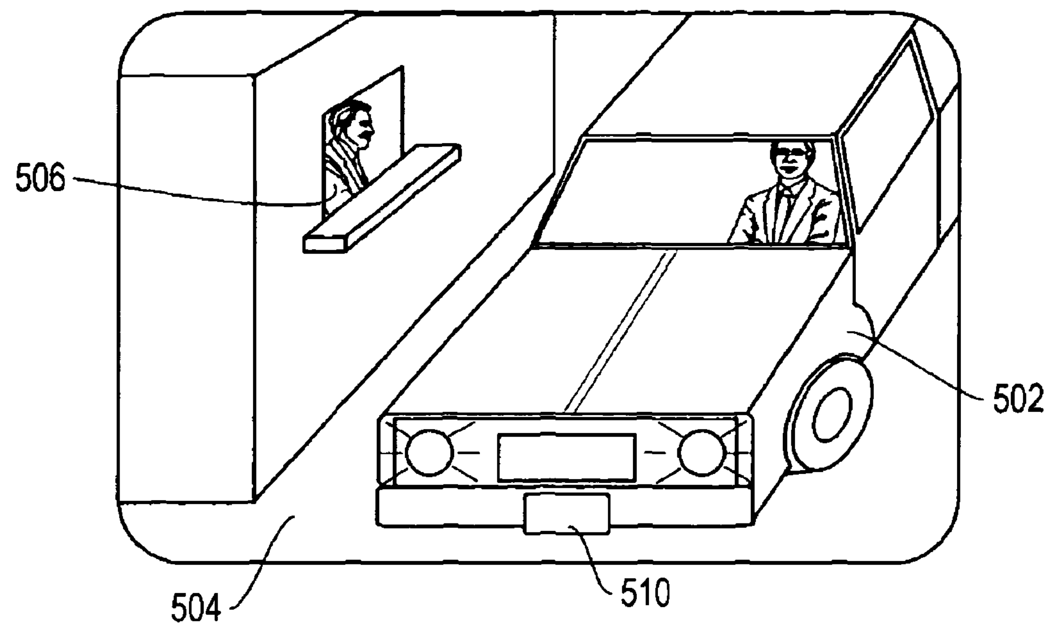
FIG. 5A illustrates occurrence of a bright event as viewed using an unmodified default video camera exposure.

If $B_c$, the number of bright luma samples determined in step 205 using Equation (1), is greater than or equal to the value of $T_e$, it indicates that a bright even has occurred, i.e., a bright object (e.g., license plate) has entered the field of view of camera system 100 under low light scene conditions. FIG. 5A illustrates an occurrence of such a bright event when an automobile 502 is driven into a bank drive-through stall 504 opposite a bank teller window 506 under low light scene conditions, e.g., at night. In this situation, the default video camera exposure level that is suited for the low light bank drive-through scene does not allow information on license plate 510 to be captured. Instead, information on license plate 510 is overexposed and not legible. When such a bright event is detected in step 206 the removable IR block filter is locked in retracted position 114*a* in step 208, timer $t_{timer}$ is started, and adaptive exposure modification algorithm 210 proceeds to step 214 to further evaluate the need for exposure modification.

Figure 5B:
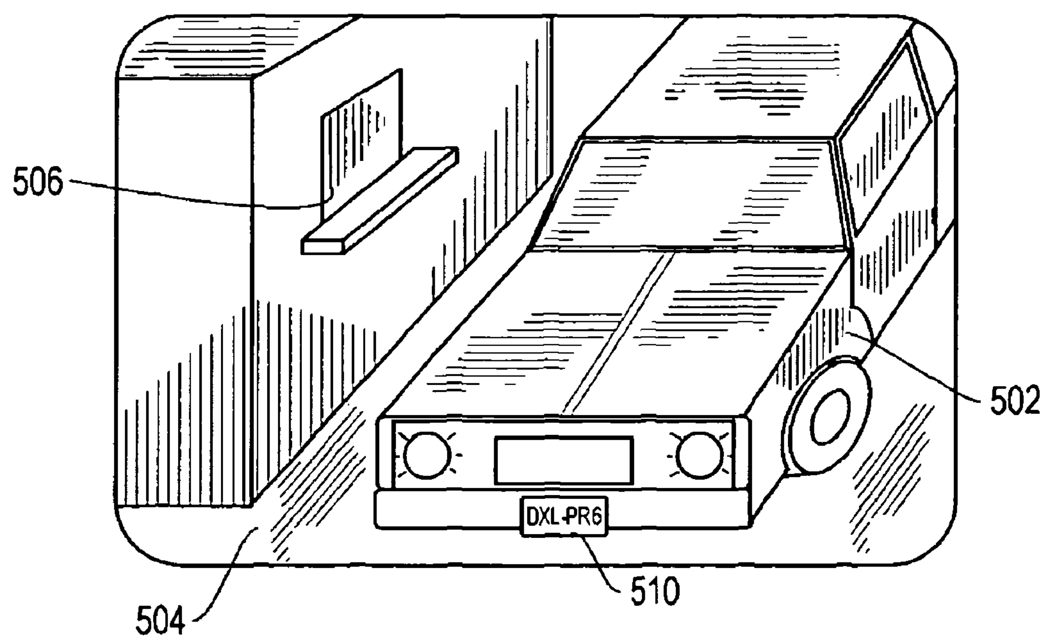
FIG. 5B illustrates occurrence of a bright event as viewed using a modified video camera exposure according to one exemplary embodiment of the disclosed systems and methods.

With regard to Inequality (2), a value for $T_e$ may be determined in one exemplary embodiment, for example, by setting up a test scene typical of the intended application (e.g., the bank drive through in FIGS. 5A and 5B). In such a case, the value of $T_e$ may be set to the largest value that will reliably cause $B_c$ to exceed $T_e$ when an automobile 502 enters the camera's field of view. In this regard, a value of $T_e$ that is too large would result in $B_c$ not exceeding $T_e$ in the presence of an automobile 502 (i.e., resulting in a missed bright event), while a value of $T_e$ that is too small may result in $B_c$ exceeding $T_e$ when an automobile 502 is not present (i.e., resulting in a false alarm). It will be understood that a determined value of $T_e$ also depends in part on the total number luma samples employed for a given application. In one exemplary system embodiment employing 1280×720 luma samples, an exemplary value of $T_e$ may be about 0.1% of the total luma samples, although lesser or greater values of $T_e$ are also possible.

Next, the value of $B_c$ is then compared in step 214 to $T_b$, a threshold that controls the number of overexposed samples as shown in Inequality (3).

$$B_c \geqq T_b \qquad \text{Inequality (3)}$$

where:

$T_b$ is the maximum number of bright luma samples that are allowed without taking action.

With regard to Inequality (3), the value of an exposure modification threshold number of luma samples such as $T_b$ may be chosen at system setup time to maximize the probability of selecting the correct exposure level for a license plate. This may be done using any suitable methodology, e.g., based on empirical measurement, etc. For example, in one exemplary embodiment used to determine $T_b$ a test scene may be set up that consists of an automobile with headlights on, an IR illuminated license plate and dark background. If the value of $T_b$ is too small, it will cause the modified exposure to darken the scene such that the license plate is underexposed (i.e., too dark to be legible), indicating that the value of $T_b$ should be increased to allow more bright luma samples. At some value of $T_b$, all luma samples associated with the headlights will be categorized as bright (e.g., overexposed) while the less-bright license plate will be correctly exposed. If however the value of $T_b$ is too large, luma samples associated with the license plate will be categorized as bright and the plate will be unreadable due to overexposure. In this case, the value of $T_b$ should be decreased until step 216 of the modified exposure algorithm 210 darkens the scene enough to make the license plate legible. It will be understood that a determined value of $T_b$ also depends in part on the total number luma samples employed for a given application. In one exemplary system embodiment employing 1280×720 luma samples, an exemplary value of $T_b$ may be about 0.05% of the total luma samples, although lesser or greater values of $T_b$ are also possible.

If in step 214 $B_c$, the number of bright luma samples determined using Equation (1), is less than $T_b$, then adaptive exposure modification algorithm 210 does not modify the default exposure, and step 214 proceeds to step 218 and 220 (described further below) which determine whether adaptive exposure modification algorithm 210 should be exited and methodology 200 should return to step 202, or whether adaptive exposure modification algorithm 210 should proceed to step 212 for recalculation of $B_c$ and then step 214 repeated as shown. However, if $B_c$ is found in step 214 to be greater than or equal to the value of $T_b$, then in step 216 adaptive exposure modification algorithm 210 modifies the default exposure of step 202 to darken the scene viewed by color video camera system 100 until Inequality (3) is no longer satisfied.

FIG. 5B is an illustration representing the low light drive-through scene of FIG. 5A, after it has been darkened by adaptive exposure modification algorithm 210 so that information on license plate 510 is now legible. At the same time, the remainder of the scene is now darker. Darkening of the scene in step 216 may be accomplished using any suitable methodology and/or in any suitable fixed or variable size exposure increment. However, in one exemplary embodiment, adaptive exposure modification algorithm 210 may darken the default exposure of the scene e.g., by providing command or control signal to exposure control circuitry and/or exposure control logic executing on processor/s 106 or any other manner suitable for modifying the default exposure. In this regard, adaptive exposure modification algorithm 210 may darken the default exposure of the scene in one exemplary embodiment by a variable size exposure increment that may be a value that is proportional to $B_c-T_b$. Such a variable size exposure increment may be desirable in one embodiment to provide a more quickly reacting algorithm, i.e., an adaptive exposure modification algorithm that reacts more quickly than the same algorithm would react if it employed a fixed exposure increment. As shown in FIG. 2, adaptive exposure modification algorithm 210 continues to modify the default exposure to darken the scene viewed by color video camera system 100 until Inequality (3) is no longer satisfied as may be determined by steps 218 and 220 that are described further below.

Still referring to FIG. 2, color video camera system 100 may continue to operate according to adaptive exposure modification algorithm 210 until one or more termination criteria are satisfied. Such termination criteria may be selected as needed or desired based on the characteristics of a given application. For example, in one exemplary embodiment, adaptive exposure modification algorithm 210 may unlock IR block filter 114 in step 222 and exit when Inequality 4 is satisfied in step 218.

$$L_c \leqq L_e \qquad \text{Inequality (4)}$$

where:

$L_c$ is the current amount of light energy incident on the camera and $L_e$ is the amount of light energy that was incident on the camera before the bright event was detected.

In this exemplary embodiment, Inequality (4) is used to detect when the bright object (e.g., license plate) leaves the field of view of color video camera system 100 as shown in step 218 of FIG. 2, in which case adaptive exposure modification algorithm 210 unlocks IR block filter 114 in step 222 and exits to step 202. However, if inequality 4 is not satisfied, an additional exemplary criteria represented by Inequality (5) may be evaluated in step 220 to determine if some prescribed time interval, $t_{reset}$, has elapsed since bright event detection in step 206.

$$t_{timer} \geqq t_{reset} \qquad \text{Inequality (5)}$$

where:

$t_{timer}$ is a timer measured in seconds that starts when the event is detected and $t_{reset}$ is the amount time before the timer is reset.

When implemented in step 220, the criteria described by Inequality (5) enables the adaptive exposure modification algorithm 210 to unlock IR block filter 114 in step 222 and exit to step 202 in the event that a scene brightens for a long period of time (e.g., sunrise). The value of $t_{reset}$ is in general application dependent, and may be selected as needed or desired based on the characteristics of a given video application. For example, for a video application involving video surveillance of a bank drive-through, a transaction at a drive-through bank teller station might be considered to average about 5 minutes. During such a transaction it is desirable to use color video camera system 100 to capture license plate information. Thus, for example, a timer reset value $t_{reset}$ may be selected to be on the order of about 10 minutes, i.e., sufficiently long enough so that adaptive exposure modification algorithm 210 continues to operate during the anticipated duration of most drive-through transactions, but exits after a time length that is longer than the large majority of drive-through transactions. However, in the event that Inequality (5) is not satisfied (i.e., prescribed time interval, $t_{reset}$ has not elapsed since bright event detection in step 206) then adaptive exposure modification algorithm 210 proceeds to step 212 where $B_c$ is computed again, and then returns to step 214 where the new value of $B_c$ is compared to $T_b$.

FIG. 3 shows interrelated states and methodology 300 of a video camera system that is configured with an adaptive exposure modification algorithm according to one exemplary embodiment of the disclosed methods and systems. Specifically, FIG. 3 shows how system exposure state, $S_E$ is determined. As shown in FIG. 3, a luma signal is generated in step 302 and histogram calculated in step 304. The current system exposure state, $S_E$ is evaluated in step 310 and the result determines how methodology 300 proceeds. If the system is not operating in the modified exposure state (i.e., $S_E$=default), then $B_c$ is calculated in step 308. Next, in step 312, $B_c$ is compared to $T_e$ to determine if $B_c$ is greater than or equal to $T_e$, and current IR block filter state, $S_{IR}$ from step 301 is evaluated to determine if it is in unfiltered (i.e., retracted) state. If both the preceding conditions do not concurrently exist, then no action is taken as shown in step 316, and the system continues to operate in default exposure state (i.e., $S_E$=default). However, if both conditions are found to concurrently exist in step 312, then the IR block filter is locked in the unfiltered (i.e., retracted) position and system exposure state is changed to modified (i.e., $S_E$=modified) as represented by step 320 of FIG. 3. At the same time, a timer is started in step 318 to monitor the amount of time $t_{timer}$ elapsed since the exposure state modification. This monitored time, $t_{timer}$, is used in step 314 as described further below.

Returning to step 310 of FIG. 3, if the system is operating in the modified exposure state (i.e., $S_E$=modified), then a value of $L_c$ is calculated in step 306, and then compared to a value of $L_e$ in step 314. If the value of $L_c$ is found to be greater than the value of $L_e$ in step 314, and if $t_{timer}$ is found to be less than $t_{reset}$ in step 314, then no action is taken as represented by step 316 and the system continues to operate in the modified exposure state (i.e., $S_E$=modified). However, if the value of $L_c$ is found to be less than or equal to the value of $L_e$ in step 314, or if $t_{timer}$ is found to be greater than or equal to $t_{reset}$ in step 314, then the IR block filter is unlocked, and system exposure state is changed to default (i.e., $S_E$=default) as represented in state 322 of FIG. 3.

Figure 4:
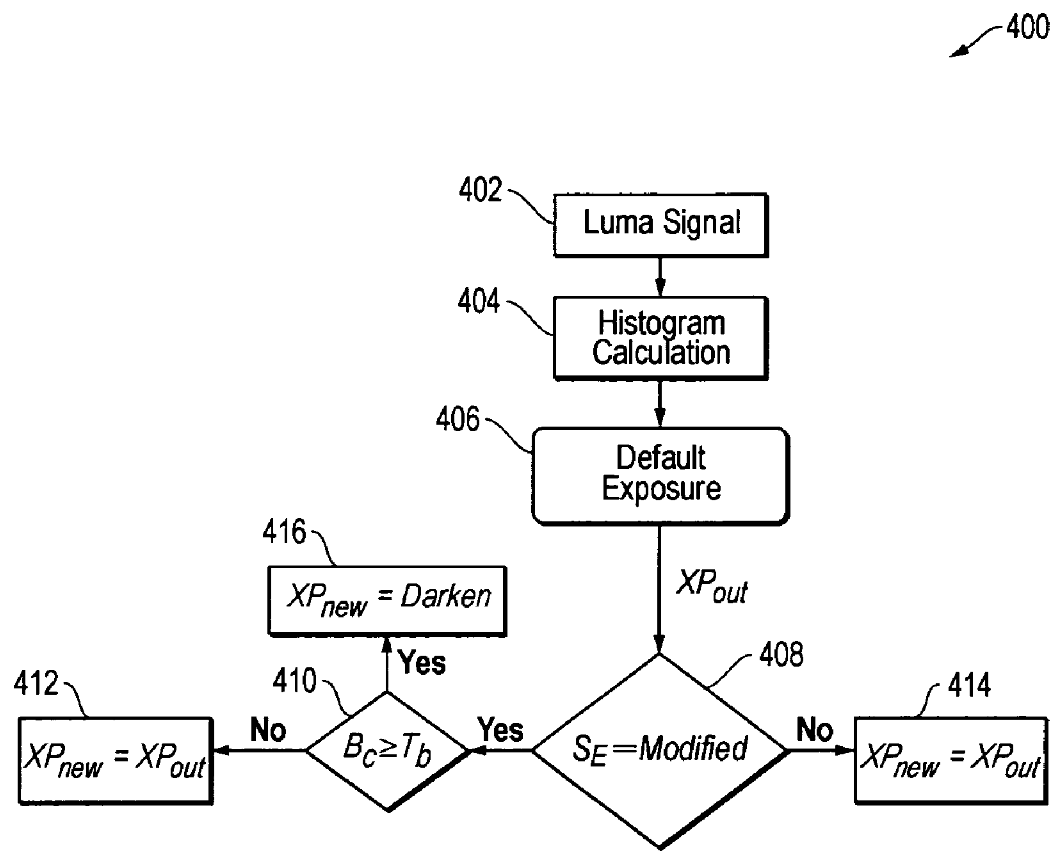
FIG. 4 shows interrelated states and methodology according to one exemplary embodiment of the disclosed methods and systems.

FIG. 4 shows various interrelated states and methodology 400 of a video camera system that is configured with an adaptive exposure modification algorithm according to one exemplary embodiment of the disclosed methods and systems. Specifically, FIG. 4 shows how the modified exposure level $XP_{new}$ is determined. As shown in FIG. 4, a luma signal is generated in step 402, histogram calculated in step 404, and exposure level of the camera system, $XP_{out}$ is provided in step 406. The current system exposure state, $S_E$ is evaluated in step 408 and the result determines how methodology 400 proceeds. If the system is not operating in the modified exposure state (i.e., $S_E$=default), then the exposure level of the camera system, $XP_{new}$ remains equal to the existing and unmodified default exposure level $XP_{out}$ as represented by step 414 of FIG. 4. However, if the system is operating in the modified exposure state ($S_E$=modified), then $B_c$ is compared to $T_b$ in step 410. If $B_c$ is greater than or equal to $T_b$ in step 410, then the default exposure level $XP_{out}$ is modified by darkening in a manner as described elsewhere herein (e.g., until $B_c$ is no longer found to be greater than or equal to $T_b$) to produce an exposure level, $XP_{new}$ in step 416 that is darkened relative to $XP_{out}$. Alternatively, if $B_c$, is not found to be greater than or equal to $T_b$ in step 410, then the exposure level of the camera system, $XP_{new}$, remains equal to the existing and unmodified default exposure level $XP_{out}$ as indicated by step 412 of FIG. 4.

It will also be understood that the steps and states of FIGS. 3, 4 and 5 are exemplary, and that fewer or additional steps and/or states may be present or performed, and/or that the indicated steps of FIGS. 3, 4 and 5 may be performed in any alternative sequence that is suitable for either automatically detecting the presence or absence of a bright object in the field of view of a video camera and/or for adaptively modifying video camera exposure level to improve ability to capture information or other details from the bright object.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method for modifying a default exposure level of a video image, wherein said video image is generated by a video camera system and represents a scene in the field of view of said video camera, said method comprising:

determining if said scene is a low light scene;

determining a number of bright luma samples in said video image having a default exposure level;

modifying said default exposure level of said video image based on a comparison of said number of bright luma samples in said video image to an exposure modification threshold number of luma samples; and darkening said default exposure level of said video image if said scene is a low light scene and said number of bright luma samples in said video image is greater than or equal to said exposure modification threshold number of luma samples.

2. The method of claim 1, further comprising determining said number of bright luma samples in said video image after said darkening of said exposure level; and then further darkening said exposure level of said video image if said number of bright luma samples in said video image is greater than or equal to said exposure modification threshold number of luma samples.

3. The method of claim 1, further comprising first determining if said number of bright luma samples in said video image is indicative of the presence of at least one bright object in said video image prior to modifying said default exposure level of said video image based on a comparison of said number of bright luma samples in said video image to said exposure modification threshold number of luma samples.

4. The method of claim 3, wherein said method further comprises comparing said number of bright luma samples determined to be in said video image to a minimum number of bright luma samples to determine if said number of bright luma samples in said video image is indicative of the presence of at least one bright object in said video image, said minimum number of bright luma samples being indicative of the presence of at least one bright object in said video image.

5. The method of claim 4, wherein said bright object comprises an automobile license plate.

6. The method of claim 4, wherein said minimum number of bright luma samples is a number of bright luma samples determined by empirical measurement to be indicative of the presence of a bright object in a video image.

7. The method of claim 1, wherein said threshold number of luma samples is a number of luma samples determined by empirical measurement.

8. A method for detecting bright objects in a video image, wherein said video image is generated by a video camera system and represents a scene in the field of view of said video camera, said method comprising:

determining if said scene is a low light scene;

determining a number of bright luma samples in said video image;

determining if said number of bright luma samples in said video image is indicative of the presence of at least one bright object in said video image; and darkening a default exposure of said video image if said scene is a low light scene and said number of bright luma samples is indicative of the presence of at least one bright object in said video image.

9. The method of claim 8, wherein determining said number of bright luma samples in said video image comprises determining a number of bright luma samples in said video image that have a brightness greater than a brightness threshold.

10. The method of claim 8, wherein said method further comprises comparing said number of bright luma samples determined to be in said video image to a minimum number of bright luma samples to determine if said number of bright luma samples in said video image is indicative of the presence of at least one bright object in said video image, said minimum number of bright luma samples being indicative of the presence of at least one bright object in said video image.

11. The method of claim 10, wherein said bright object comprises an automobile license plate.

12. The method of claim 11, wherein darkening a default exposure of said video image comprises darkening the default exposure of said video image when a result of said comparison indicates the presence of said license plate in said video image.

13. The method of claim 8, wherein said minimum number of bright luma samples is a number of bright luma samples determined by empirical measurement to be indicative of the presence of a bright object in a video image.

14. The method of claim 8, further comprising modifying said default exposure of said video image based on a determination that said number of bright luma samples in said video image is indicative of the presence of at least one bright object in said video image.

15. A system configured to modify a default exposure level of a video image, said system comprising logic configured to:

determine a number of bright luma samples in said video image having a default exposure level;

modify said default exposure level of said video image based on a comparison of said number of bright luma samples in said video image to an exposure modification threshold number of luma samples;

darken said default exposure level of said video image if said number of bright luma samples in said video image is greater than or equal to said exposure modification threshold number of luma samples; and determine said number of bright luma samples in said video image after said darkening of said default exposure level and further darken said default exposure level of said video image if said number of bright luma samples in said video image is greater than or equal to said exposure modification threshold number of luma samples.

16. The system of claim 15, wherein said video image is generated by a video camera system and represents a scene in the field of view of said video camera; and wherein said logic is further configured to:

determine if said scene is a low light scene; and darken said default exposure level of said video image if said scene is determined to be a low light scene and if said number of bright luma samples in said video image is greater than or equal to said threshold number of luma samples; or not darken said default exposure level of said video image if said scene is not determined to be a low light scene, or if said number of bright luma samples in said video image is less than said exposure modification threshold number of luma samples.

17. The system of claim 15, wherein said logic is further configured to first determine if said number of bright luma samples in said video image is indicative of the presence of at least one bright object in said video image prior to modifying said default exposure level of said video image based on a comparison of said number of bright luma samples in said video image to said exposure modification threshold number of luma samples.

18. The system of claim 17, wherein said logic is further configured to compare said number of bright luma samples determined to be in said video image to a minimum number of bright luma samples to determine if said number of bright luma samples in said video image is indicative of the presence of at least one bright object in said video image, said minimum number of bright luma samples being indicative of the presence of at least one bright object in said video image.

19. The system of claim 18, wherein said bright object comprises an automobile license plate.

20. The system of claim 18, wherein said minimum number of bright luma samples is a number of bright luma samples determined by empirical measurement to be indicative of the presence of a bright object in a video image.

21. The system of claim 15, wherein said threshold number of luma samples is a number of luma samples determined by empirical measurement.

22. The system of claim 15, wherein said system comprises a part of a video camera system.

23. A system configured to detect bright objects in a video image, wherein said video image is generated by a video camera system and represents a scene in the field of view of said video camera, said system comprising logic configured to:

determine if said scene is a low light scene:

determine a number of bright luma samples in said video image;

determine if said number of bright luma samples in said video image is indicative of the presence of at least one bright object in said video image; and darken a default exposure of said video image if said scene is a low light scene and said number of bright luma samples is indicative of the presence of at least one bright object in said video image.

24. The system of claim 23, wherein said logic is configured to determine said number of bright luma samples in said video image by determining said number of bright luma samples in said video image that have a brightness greater than a brightness threshold.

25. The system of claim 23, wherein said logic is further configured to compare said number of bright luma samples to a minimum number of bright luma samples to determine if said number of bright luma samples in said video image is indicative of the presence of at least one bright object in said video image, said minimum number of bright luma samples being indicative of the presence of at least one bright object in said video image.

26. The system of claim 23, wherein said bright object comprises an automobile license plate.

27. The system of claim 23, wherein said minimum number of bright luma samples is a number of bright luma samples determined by empirical measurement to be indicative of the presence of a bright object in a video image.

28. The system of claim 23, wherein said logic is further configured to modify a default exposure of said video image based on a determination that said number of bright luma samples in said video image is indicative of the presence of at least one bright object in said video image.

29. The system of claim 28, wherein said bright object comprises an automobile license plate.

30. The system of claim 23, wherein said system is included within said video camera system.

* * * * *